United States Patent
Stephen

(10) Patent No.: US 7,802,953 B2
(45) Date of Patent: Sep. 28, 2010

(54) INSET PANEL FASTENER

(76) Inventor: Robert Stephen, 2755 Thompson Creek Rd., Pomona, CA (US) 91767

(*) Notice: Subject to any disclaimer, the term of this patent is extended or adjusted under 35 U.S.C. 154(b) by 624 days.

(21) Appl. No.: 11/724,936

(22) Filed: Mar. 16, 2007

(65) Prior Publication Data

US 2008/0226413 A1 Sep. 18, 2008

(51) Int. Cl.
F16B 39/16 (2006.01)

(52) U.S. Cl. .................. 411/246; 411/260; 411/903; 411/303

(58) Field of Classification Search ............. 411/190, 411/204, 237, 238, 246, 260, 900, 902, 903, 411/432, 303, 259, 308, 263
See application file for complete search history.

(56) References Cited

U.S. PATENT DOCUMENTS

| | | | | |
|---|---|---|---|---|
| 2,429,103 A * | 10/1947 | Mitchell | ............... | 411/259 |
| 3,262,480 A * | 7/1966 | Storch | ............... | 411/303 |
| 3,265,107 A | 8/1966 | Glicksman | ............... | 151/7 |
| 3,282,015 A * | 11/1966 | Rohe et al. | ............... | 52/704 |
| 3,289,724 A | 12/1966 | Ernest | ............... | 151/7 |
| 3,388,627 A | 6/1968 | Tinnerman | ............... | 85/32 |
| 3,468,212 A | 9/1969 | Tinnerman | ............... | 85/32 |
| 3,520,342 A | 7/1970 | Scheffer | ............... | 151/7 |
| 3,635,272 A | 1/1972 | Scheffer | ............... | 151/7 |
| 3,742,808 A | 7/1973 | Trembley | ............... | 85/32 |
| 3,964,531 A * | 6/1976 | Schenk | ............... | 411/82.1 |
| 4,126,170 A | 11/1978 | DeHaitre | ............... | 151/7 |
| 4,248,285 A * | 2/1981 | Flaig | ............... | 411/246 |
| 4,509,308 A * | 4/1985 | Dettfurth et al. | ............... | 52/787.1 |
| 4,817,264 A * | 4/1989 | Worthing | ............... | 29/512 |
| 4,846,612 A | 7/1989 | Worthing | ............... | 411/82 |
| 4,872,903 A * | 10/1989 | Periou | ............... | 74/89.38 |
| 4,880,343 A * | 11/1989 | Matsumoto | ............... | 411/222 |
| 4,973,208 A | 11/1990 | Gauron | ............... | 411/82 |
| 5,092,550 A * | 3/1992 | Bettini | ............... | 248/188.4 |
| 5,378,099 A | 1/1995 | Gauron | ............... | 411/82 |
| 5,632,582 A | 5/1997 | Gauron | ............... | 411/82 |
| 5,713,706 A * | 2/1998 | Lozano | ............... | 411/171 |
| 5,779,413 A | 7/1998 | Cosenza | ............... | 411/302 |
| 6,264,412 B1 | 7/2001 | Nakamura et al. | ............... | 411/352 |
| 6,481,943 B2 | 11/2002 | Coudrais et al. | ............... | 411/55 |
| 7,465,136 B2 * | 12/2008 | Nagayama | ............... | 411/178 |

* cited by examiner

*Primary Examiner*—Flemming Saether
(74) *Attorney, Agent, or Firm*—Russo & Duckworth, LLP; David G. Duckworth

(57) ABSTRACT

An inset panel fastener is provided primarily for honeycomb substrates, such as those employed in the aircraft industry. The inset panel fastener includes a plastic body portion and a metal female threaded nut positioned within the body. The body includes a cylindrical barrel shape having a top and a bottom. A bore extends through the body from the top to form an opening for receipt of a male fastener. The metal nut has locking threads and is positioned in body's bore at the body's top proximal extremity. The body further includes non-locking plastic female threads integrally formed into said body's bore. The plastic female threads have the same diameter as the metal threads and are immediately adjacent to the metal threads so as to form continuous threads for permitting receipt of a male threaded fastener. The metal female threads are locking threads to provide a locking action for locking a male fastener to the inset panel fastener. Meanwhile, the plastic female threads provide primary load bearing capabilities for the inset panel fastener.

12 Claims, 3 Drawing Sheets

INSET PANEL FASTENER

BACKGROUND OF THE INVENTION

The present invention relates to mounts and fasteners. More specifically, the present invention relates to inset panel fasteners which are particularly useful within the aircraft industry.

Many types of mounting devices have been developed for holding one or more objects to a support surface. For example, inset-type fasteners are generally anchored into a structure and include an engagement portion, such as the male or female threads of a screw, for securing objects to the structure. Inset fasteners are particularly advantageous when a strong connection between the structure and object cannot be readily obtained through use of a surface mounted structure.

Sandwich panels are used extensively in the aircraft and marine industries. These sandwich panels typically are made of fiberglass or similar material formed in a honeycomb structure. The honeycomb structure is then typically sandwiched between outer layers of aluminum panels or the like. These sandwich panels are preferred as a result of their relatively inexpensive price, lightweight and high strength. In order to anchor objects to the sandwich panel, inset panel fasteners are typically used. To anchor the inset panel fastener in place, a cavity is typically formed directly through the outer aluminum layer into the honeycomb core using a drill or the like. The inset panel fastener is then positioned within the cavity and an adhesive or other binding material is injected into the cavity to secure the fastener to the honeycomb core. Since the cavity is cylindrical, most inset panel fasteners include a cylindrical body having a central bore. The central bore typically includes female threads functioning as a fastener element. Alternatively, some inset panel fasteners include a floating fastener element in the form of a nut which also includes female threads which is floatingly positioned within the bore. Examples of inset panel fasteners including floating elements include U.S. Pat. Nos. 4,973,208 and 5,632,582. Inset panel fasteners have been manufactured from a variety of materials. For example, it has been known to manufacture an inset panel fastener of various metals including steel and titanium. Conversely, U.S. Pat. No. 4,846,612 describes a one piece inset panel fastener made from a thermoplastic.

All metal fasteners provide extremely high strength to an affixed fastener element. However, adhesives and potting materials typically do not bond to an all metal material, such as titanium, as well as to a plastic material. All metal fasteners are also heavy and expensive.

Meanwhile, inset panel fasteners made of plastic suffer from disadvantages of their own. Like metal inset panel fasteners, most plastic inset panel fasteners include a cylindrical body. The cylindrical body includes a central bore including integrally formed female threads or includes a separate female fastener element, often constructed of metal. The body further includes an opening or entrance formed at the body's top for insertion of a male fastener element to engage the female fastener element. Projecting radially from the top of the body, the inset panel fastener further includes a disk which has a diameter greater than the diameter of the body to form a cavity space around the body's for injection of an adhesive or potting material within the sandwich panel cavity.

Unfortunately, these plastic inset panel fasteners suffer from several disadvantages. Fasteners having plastic threads can often withstand the load bearing stresses imposed by an object affixed to the substrate. However, threads made of plastic are typically not acceptable as locking threads where repeated engagement and disengagement may be encountered. Locking female threads have a means of providing extra friction between itself and the male threads of a bolt. Typically, locking female threads are distorted to insure interference during engagement to male threads. This interference provides the desired "locking action" caused by a large increase in friction. In practice, this "locking action" is evident to a technician as a sudden rise in "running torque" when male threads engage locking female threads.

It is preferred that female locking threads be able to withstand fifteen (15) or more cycles of full engagement and disengagement with a male threaded element as specified in aircraft industry specification NASM 25027 which is incorporated by reference herein. Unfortunately, the telescopic rotations of the male threads against the plastic female threads of a plastic female fastener element causes the locking mechanism to wear down after only a few engagements and disengagements. Once the locking mechanism has worn down, the locking threads are no longer capable of "locking" the male threads to the female threads making unwanted disengagement an unacceptable possibility. Accordingly, inset panel fasteners having plastic threads have not be adopted in industry where a locking feature is required.

Inset panel fasteners having been constructed to include a plastic outer body and a metal inner female fastener element, commonly referred to as a nut. These composite constructions are lighter than all metal constructions. In addition, the female metal threads of the nut are capable of fifteen or more cycles of engagement and disengagement with a male fastener without eliminating the locking capabilities of locking threads. Unfortunately, these constructions are still undesirably heavier than all plastic constructions.

Thus, it would be advantageous to provide an improved inset panel fastener which included locking threads capable of fifteen cycles or more without loss of locking capabilities.

It would be an additional advantage to provide an improved panel fastener that was lightweight.

It would be still an additional advantage to provide an improved inset panel fastener that was lightweight comparable to an all plastic fastener, but provided the cyclic locking capabilities of an all metal fastener.

Furthermore, it would be still an additional advantage to provide an improved inset panel fastener that was inexpensive to manufacture.

SUMMARY OF THE INVENTION

The present invention addresses the aforementioned disadvantages by providing an improved composite inset panel fastener, primarily for use with honeycomb sandwich panels utilized in the aircraft industry.

The inset panel fastener includes a body and a metal female threaded element, referred to herein as a nut. Meanwhile, the body is made of various plastics as can be selected by those skilled in the art. A preferred plastic is polyetherimide. The body is preferably cylindrical and barrel shaped so as to include a central bore extending from the body's top proximal extremity towards the body's bottom distal extremity to form a central chamber. The top is preferably plainer so as to be flush with a substrate. Further, the top includes an opening for receiving a male threaded fastener into the plastic body's bore.

A metal female nut is positioned within the inset panel fastener's plastic bore at the body's top proximal extremity. The metal nut includes a plurality of annular threads which are concentrically aligned with the bore's longitudinal axis so as to receive a male threaded fastener through the plastic body's opening. Though nuts are typically four-sided or hexagonally six-sided, the term is intended to be interpreted broadly herein to include any female threaded fastener.

The metal nut may be made of various metals. However, 300 Series Stainless Steel is considered preferred. The metal nut's threads are constructed as locking threads. Various means for constructing locking threads can be selected by those skilled in the art. However, it is preferred that the "locking action" of the threads be provided by distorting the female threads to ensure significant interference during engagement with the male threads of a male threaded fastener. There may be any number of locking threads as can be selected by one skilled in the art. However, it is preferred that the female nut include sufficient locking threads to comply with NASM 25027

The inset panel fastener further includes female threads integrally formed within the plastic body's central bore. The plastic female threads are positioned concentric, have the same diameter, and are immediately distal to the metal threads of the metal female nut. The plastic non-locking threads are positioned immediately adjacent to the locking threads to form a continuous set of threads positioned and constructed for permitting threaded receipt of a male threaded fastener into the plastic body's opening, through the metal female threads, and thereafter through the plastic female threads. The number of plastic female threads can be determined by those skilled in the art depending on load bearing applications. Preferably, the plastic female threads number more than the metal female threads so as to provide for primary load bearing.

It is a principal object of the present invention to provide an improved inset panel fastener which provides high strength.

It is another object of the present invention to provide an inset panel fastener which is lighter than comparable inset panel fasteners.

It is still another object of the present invention to provide an inset panel fastener which is inexpensive to manufacture and easy to use.

These and other further and more specific objects and advantages of the invention will be apparent to those skilled in the art from the following detailed description taken in conjunction with the drawings.

DETAILED DESCRIPTION OF THE INVENTION

Figure 1:
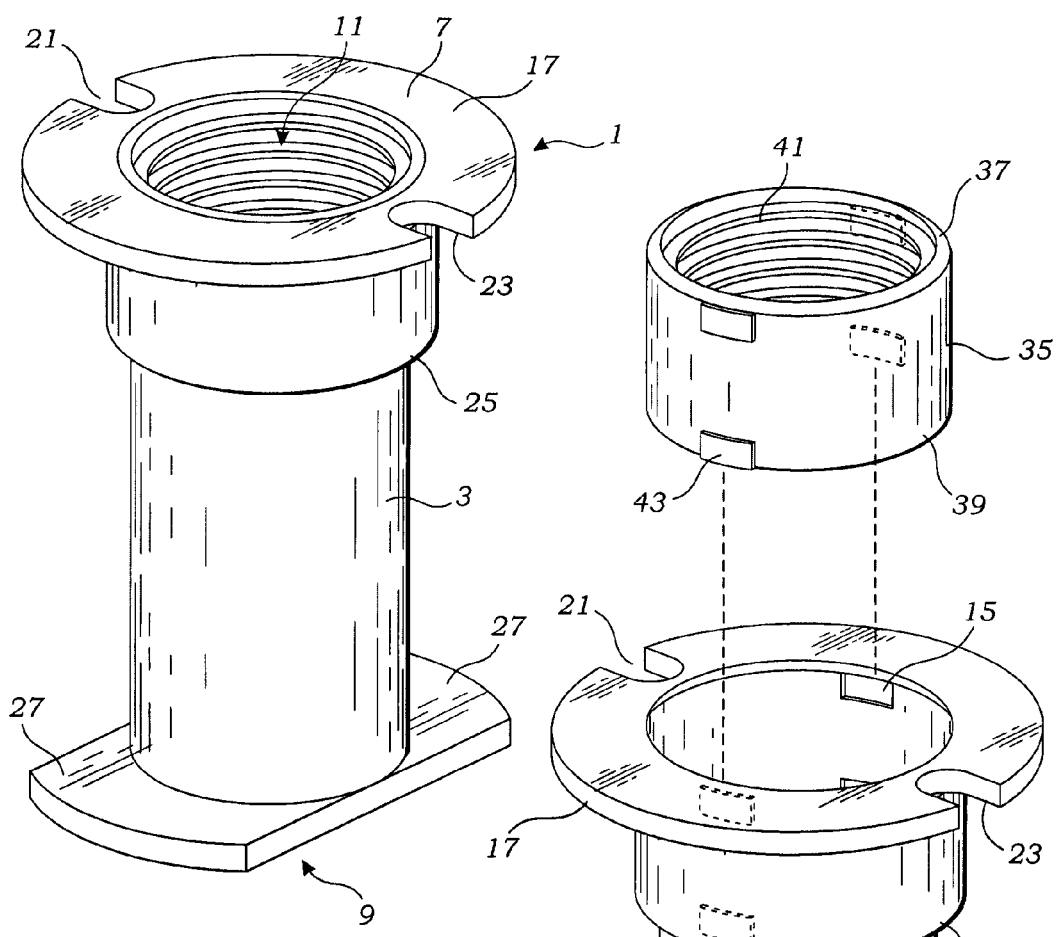
FIG. 1 is a perspective view of an inset panel fastener of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-5, the inset panel fastener 1 of the present invention includes a plastic body 3 and metal female fastener 35 referred to herein as a nut. Cavities formed in honeycomb sandwich panels for receipt of an inset panel fastener are typically round and formed by a drill. Accordingly, the plastic body 3 of the inset panel fastener 1 preferably has a cylindrical barrel shape, and a top proximal extremity 7 and bottom distal extremity 9. The plastic body 3 further includes a central vertically extending bore centrally aligned with the inset panel fastener's longitudinal axis 29. The bore 11 projects upwardly through the plastic body 3 to form an opening 31 to allow the introduction of a male fastener.

Figure 5:
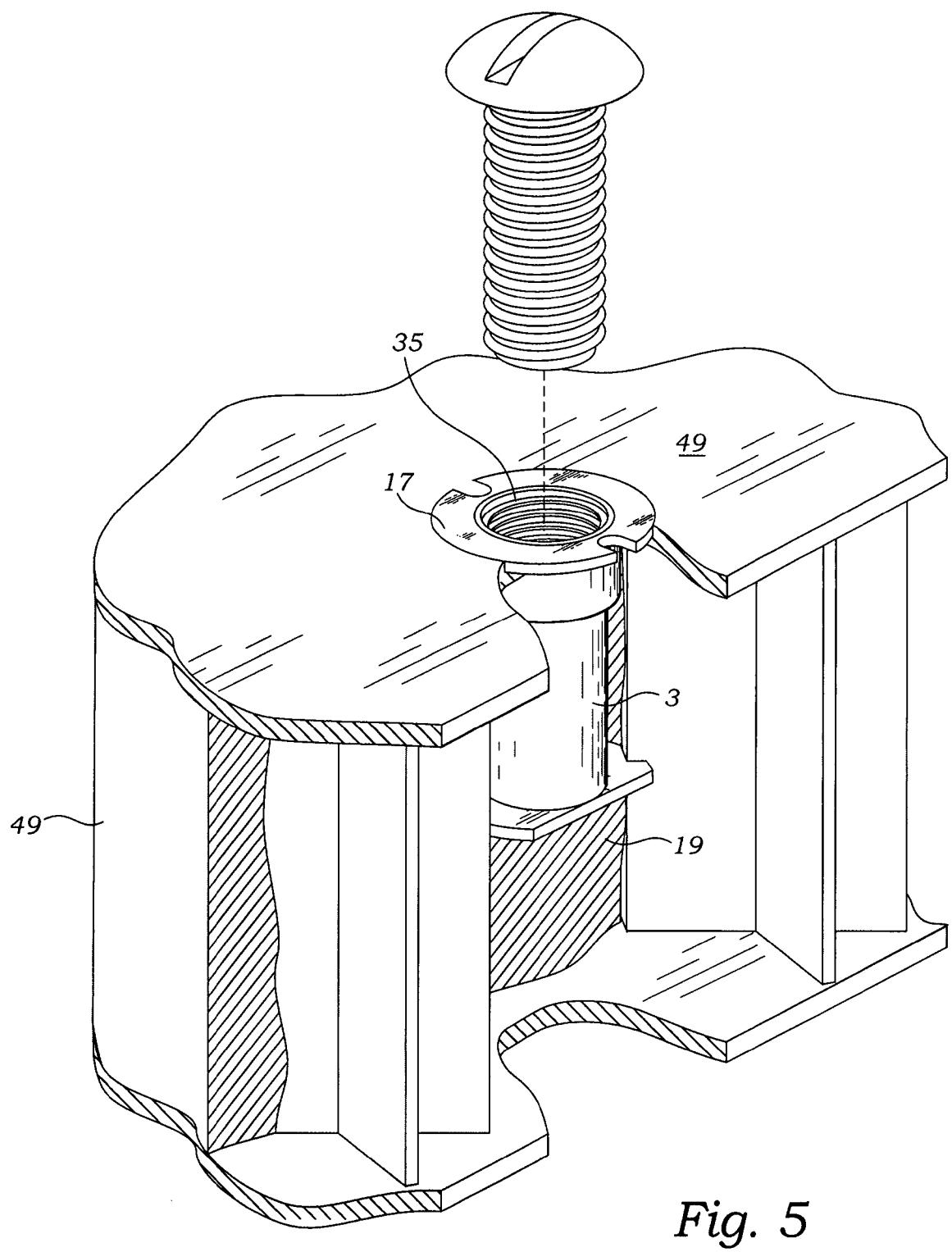
FIG. 5 is a perspective view illustrating the inset panel fastener of the present invention mounted within a honeycomb substrate.

The inset panel fastener body 3 further includes a disk portion 17 which radially projects from the top of the body 3. With reference to FIG. 5, the disk 17 has a diameter greater than the diameter of the body's cylindrical barrel portion to form an annular cavity space 19 when the inset panel fastener is placed within a cavity formed within a honeycomb panel. The disk 17 further includes a fill hole 21 and a vent hole 23 for allowing the introduction of an adhesive material for bonding the inset panel fastener to the substrate.

The metal nut 35 may be constructed of various materials. However, it is preferred that it is manufactured of a 300 Series stainless steel. In typical fashion, the nut 35 includes a top 37, a bottom 39 and a central bore which is threaded for receipt of a corresponding male fastener. The metal nut 35 is positioned within the plastic body's central bore 11 at its top proximal extremity. Furthermore, the metal nut's threads 41 are concentrically aligned within the bore's longitudinal axis 29 for receiving a metal fastener when a metal fastener is introduced into the plastic body's opening 31. Of importance, the metal nut's threads are constructed as locking threads. Preferably the locking threads are distorted relative to the male threads of a corresponding male fastener so as to provide increased friction and ensure significant interference to provide a "locking action".

Figure 2:
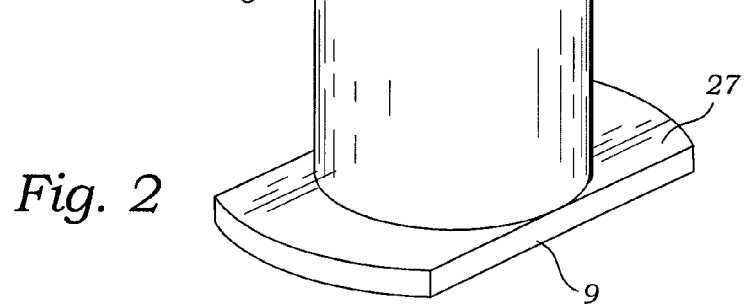
FIG. 2 is a perspective exploded view of the inset panel fastener shown in FIG. 1.

As best illustrated in FIG. 2, in a preferred embodiment, the nut 35 is substantially cylindrical and includes a plurality of projections 43 which are sized and positioned to project into recesses 15 formed within the plastic body. The projections affix the nut 35 within the plastic body 3, and prevent the nut 35 from rotating relative to the body when rotational forces are exerted by a male threaded fastener during engagement or disengagement. Other means for affixing the nut within the plastic body may be employed by those skilled in the art. For example, a typical hexagonal nut may be employed within the inset panel fastener. However, it is preferred that the nut be cylindrical to provide the greatest weight savings.

The inset panel fastener's body 3 also includes female threads 13 integrally formed within the plastic body's central bore 11. The plastic female threads have the same diameter as the male threads of the metal nut 35. Further, the plastic threads are concentrically aligned with the inset panel fastener's longitudinal axis and are positioned immediately distal to the metal threads of the metal nut 35. The plastic threads are preferably non-locking and positioned immediately adjacent to the locking threads of the nut to form a continuous set of threads for receipt of a male threaded fastener through the plastic body's opening 31.

Though not shown in the drawings, it is preferred that the metal threads include chamfers at both the top 37 and bottom 39 ends of the nut. The chamfer at the top facilitates acceptance of the male threaded fastener. Meanwhile, the chamfer is not needed at the interior bottom end 39 of the nut. However, the chamfer advantageously eliminates the need to orient the threads 41 of the metal nut with the plastic threads 13 of the plastic body during an encapsulation/molding process.

It is preferred that the metal nut include as few threads as possible to provide adequate locking capabilities. On the other hand, in a preferred embodiment, the female nut includes sufficient locking threads to comply with specification NASM 25027. A preferred length for the metal nut is 0.190 inches long with a 10/32 thread size. Where compliance with NASM 25027 is not necessary, it is preferred that the metal nut include fewer threads, but in a sufficient number for providing a locking action to the male fastener.

Figure 3:
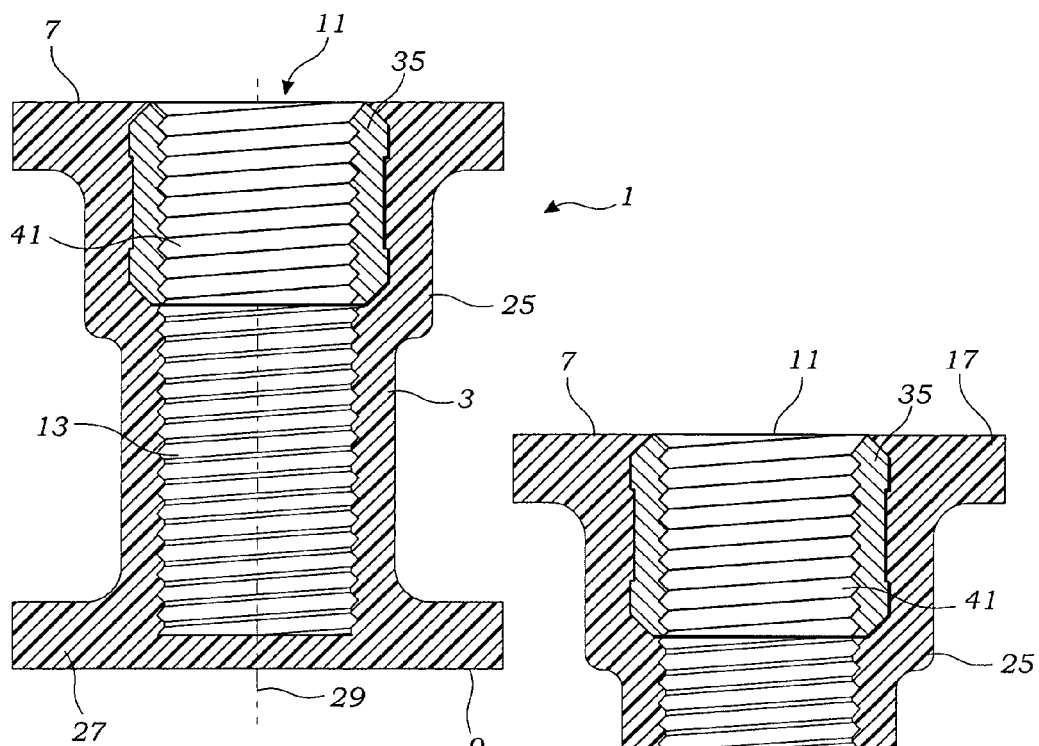
FIG. 3 is a side cut-away view of a first embodiment of an inset panel fastener of the present invention.
Figure 4:
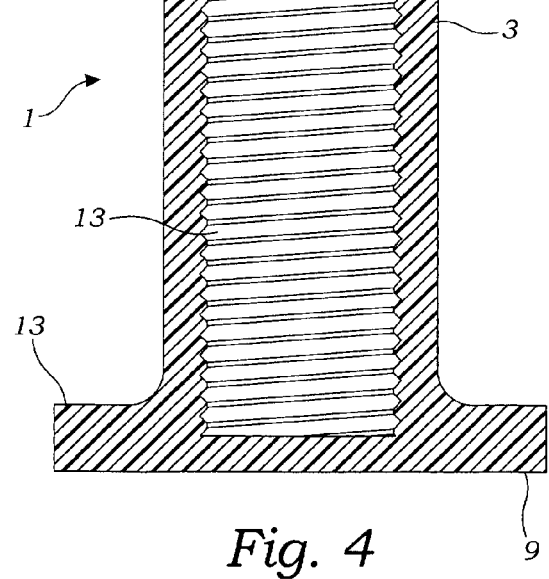
FIG. 4 is a side cut-away view of a second embodiment in an inset panel fastener of the present invention.

Meanwhile, it is preferred that the plastic female threads 13 provide for primary load bearing for objects mounted to the inset panel fastener. The number of plastic female threads can be determined by those skilled in the art depending on load bearing applications, though preferably, the number of plastic threads will number greater than the number of metal threads. For example, as shown in FIG. 3, a relatively small number of plastic female threads 12 may be provided for carrying a relatively small load. For larger loads, the inset panel fastener's body may be extended so as to include a greater number of plastic threads 13. Advantageously, each of these embodiments of an inset panel fastener includes the same nut construction thereby reducing manufacturing costs. As would be understood by those skilled in the art, numerous inset body fastener embodiments may be constructed of various lengths having the same nut 35.

Various modifications of the present invention may be made. For example, the inset panel fastener 1 may include one or more radially projecting flanges 27 to inhibit removal of the inset panel fastener from a honeycomb substrate. In addition, the inset panel fastener may include one or more vertically extending ridges or protuberances (not shown) which project outwardly from the plastic body 3 to inhibit rotation of the inset panel fastener relative to the sandwich panel once the adhesive has been introduced and cured.

While several particular forms of the invention have been illustrated and described, it will be apparent that various modifications can be made without departing from the spirit and scope of the invention. Accordingly, it is not intended that the invention be limited except by the following claims. Having described my invention in such terms as to enable persons skilled in the art to understand the invention, recreate the invention and practice it, and having identified the presently preferred embodiments thereof,

I claim:

1. An inset panel fastener for being received into a structural cavity and male fastener combination for affixing objects to a structure, the inset panel fastener and male fastener combination comprising:

a male threaded fastener element having a male helical thread; and an inset panel fastener including;

a plastic body and a metal female threaded nut;

said plastic body including a cylindrical barrel shape and having a top proximal extremity, a bottom distal extremity and a bore extending through said body to form a central chamber, said top further including an opening for receipt of said male threaded fastener element and said bore extending through said body to define a longitudinal axis;

said metal female threaded nut positioned within said body's bore at said body's top proximal extremity, said metal female threaded nut having a helical female metal locking thread having a plurality of rotations, said female metal locking thread being concentrically aligned with said bore's longitudinal axis for receipt of a male threaded fastener element; and said plastic body further including at least one helical female plastic non-locking thread integrally formed into said bore, said female plastic non-locking thread having the same diameter as the female metal locking thread, and said female plastic non-locking thread positioned concentric and immediately distal to said metal thread so that said female metal locking thread and said female plastic non-locking thread forms a continuous thread for permitting threaded receipt of said male threaded fastener element through both said metal female thread and said plastic female thread;

said female metal locking thread distorted relative to said female plastic non-locking thread such that said male fastener fastening to said inset panel fastener causes said male thread to have greater friction and thus greater locking with said metal locking thread than said plastic non-locking thread.

2. The inset panel fastener of claim 1 wherein said metal female thread includes a chamfer at both ends.

3. The inset panel fastener of claim 1 wherein said plastic female thread has a greater number of rotations than said metal female thread.

4. The inset panel fastener of claim 2 wherein said plastic female thread has a greater number of rotations than said metal female thread.

5. The inset panel fastener of claim 1 wherein said plastic body is made of polyetherimide and said metal female threaded nut is made of a steel.

6. The inset panel fastener of claim 1 wherein said plastic body includes one or more radially projecting flanges to restrict rotation of said fastener when affixed within a substrate.

7. The inset panel fastener of claim 1 further comprising a plastic disk radially projecting from said top of said body; said disk having a diameter greater than the diameter of said body to form a cavity space around said body; said disk further including a fill hole and a vent hole at the edge of said disk for allowing the injection of resin into said cavity space.

8. The inset panel fastener of claim 7 wherein said metal female thread includes a chamfer at both ends.

9. The inset panel fastener of claim 8 wherein said plastic female thread has a greater number of rotations than said metal female thread.

10. The inset panel fastener of claim 8 wherein said plastic body is made of polyetherimide and said metal female threaded nut is made of a steel.

11. The inset panel fastener of claim 7 wherein said plastic female thread has a greater number of rotations than said metal female thread.

12. The inset panel fastener of claim 7 wherein said plastic body includes one or more radially projecting flanges to restrict rotation of said fastener when affixed within a substrate.

* * * * *